United States Patent
Lehman et al.

(10) Patent No.: US 11,745,628 B2
(45) Date of Patent: Sep. 5, 2023

(54) CHILD SAFELY SEAT

(71) Applicant: Wonderland Switzerland AG, Steinhausen (CH)

(72) Inventors: David A. Lehman, Lancaster, PA (US); Kyle S. Mason, Lititz, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 17/076,697

(22) Filed: Oct. 21, 2020

(65) Prior Publication Data

US 2021/0039526 A1     Feb. 11, 2021

Related U.S. Application Data

(62) Division of application No. 16/254,442, filed on Jan. 22, 2019, now Pat. No. 10,843,597.

(Continued)

(51) Int. Cl.
    *B60N 2/28*    (2006.01)
(52) U.S. Cl.
    CPC ......... *B60N 2/2806* (2013.01); *B60N 2/2851* (2013.01); *B60N 2002/2818* (2013.01)
(58) Field of Classification Search
    CPC .......... B60R 2022/1818; B60N 2/2806; B60N 2/2851; B60N 2002/2818
    See application file for complete search history.

(56) References Cited

U.S. PATENT DOCUMENTS 6,908,151 B2 *   6/2005   Meeker ................ B60N 2/2806
                                                    297/250.1
7,090,294 B2 *   8/2006   Balensiefer, II ..... B60N 2/2806
                                                    297/256.13
(Continued)

FOREIGN PATENT DOCUMENTS

CN      201712500 U      1/2011
CN      104494485 A      4/2015
(Continued)

OTHER PUBLICATIONS

Search and Examination Report of the UK Patent Application No. 2105200.6 dated May 4, 2021.

(Continued)

*Primary Examiner* — Philip F Gabler
(74) *Attorney, Agent, or Firm* — CANTOR COLBURN LLP

(57) ABSTRACT

A child safety seat includes a seat shell having a backrest portion and a sidewall protruding forward from the backrest portion, an adjustable headrest movable along the backrest portion, and a first belt guide fixedly connected with the sidewall at a top thereof and a second belt guide provided on the headrest, wherein the first belt guide and the second belt guide are configured to receive a shoulder belt portion of a vehicle seatbelt disposed through a gap between the sidewall and the headrest. In some embodiments, the child safety seat may include a latch belt disposed transversally across the seat shell and having two opposite ends respectively provided with two connectors for attachment to an anchorage provided in a vehicle, and a storage compartment on a rear of the backrest portion adapted to receive the two connectors of the latch belt.

15 Claims, 5 Drawing Sheets

Related U.S. Application Data

(60) Provisional application No. 62/622,454, filed on Jan. 26, 2018.

(56) References Cited

U.S. PATENT DOCUMENTS

| | | | | |
|---|---|---|---|---|
| 7,735,921 | B2* | 6/2010 | Hutchinson | B60N 2/2851 |
| | | | | 297/256.14 |
| 2002/0113470 | A1 | 8/2002 | Kain | |
| 2005/0173956 | A1* | 8/2005 | Balensiefer | B60N 2/2821 |
| | | | | 297/256.11 |
| 2007/0057545 | A1* | 3/2007 | Hartenstine | B60N 2/2881 |
| | | | | 297/250.1 |
| 2009/0127902 | A1* | 5/2009 | Meeker | B60N 2/2872 |
| | | | | 297/250.1 |
| 2012/0181822 | A1 | 7/2012 | Williams et al. | |
| 2012/0242127 | A1 | 9/2012 | Gaudreau, Jr. | |
| 2012/0261958 | A1 | 10/2012 | Hutchinson et al. | |
| 2012/0292963 | A1* | 11/2012 | Sedlack | B60N 2/2851 |
| | | | | 297/256.1 |
| 2016/0207497 | A1* | 7/2016 | Seal | B60N 2/2893 |
| 2018/0326876 | A1* | 11/2018 | Oswald | B60N 2/2866 |

FOREIGN PATENT DOCUMENTS

| | | |
|---|---|---|
| CN | 205930363 U | 2/2017 |
| CN | 206141377 U | 5/2017 |
| CN | 206141381 U | 5/2017 |
| CN | 101311029 A | 11/2018 |
| DE | 68903571 | 4/1993 |
| EP | 2375941 B1 | 9/2014 |
| GB | 2560236 A1 | 9/2018 |

OTHER PUBLICATIONS

The Office Action of the Chinese Patent Application No. 201910075027.X & Baby Products Buying Guide, Consumer Report (with English translation) dated Dec. 21, 2020.

* cited by examiner

CHILD SAFETY SEAT

CROSS-REFERENCE TO RELATED APPLICATION(S)

This application is a divisional application of U.S. patent application Ser. No. 16/254,442 filed on Jan. 22, 2019, which claims priority to U.S. provisional application No. 62/622,454 filed on Jan. 26, 2018, the disclosure of which is incorporated herein by reference.

BACKGROUND

1. Field of the Invention

The present invention relates to child safety seats.

2. Description of the Related Art

A child safety seat is typically used in an automobile vehicle to properly restrain a child in the event of accidental collision. For a young child below the age of 2 years old, it is usually recommended that the child safety seat is placed in a rear facing configuration so as to provide better protection, because it can distribute crash forces over a larger portion of the child's body (i.e., the head and torso). As the child grows older, the child safety seat then may be installed in a forward facing configuration.

A child safety seat may provide different ways of restraining a child depending on the age of the child. For example, a harness integrated in the child safety seat can be used to restrain a young child of a smaller size, whereas a vehicle seatbelt can be used to restrain an older child of a greater size. When the vehicle seatbelt is used for restraining the child, the vehicle seatbelt has to be properly installed across the child safety seat to provide effective protection. In particular, the lap belt portion of the vehicle seatbelt has to be disposed low across the child's thighs, and the shoulder belt portion of the vehicle seatbelt has to lay across a center of the child's shoulder and clear of the neck. To this end, the child safety seat generally includes cavities and/or openings for the passage of the vehicle seatbelt. These conventional structures are usually narrow and may create friction with the vehicle seatbelt, in particular with the shoulder belt portion of the vehicle seatbelt, which may impede its ability to retract. As a result, the vehicle seatbelt may not be properly tensioned across the child, which would prevent force transfer between the child and the vehicle seatbelt when accidental collision occurs. In addition, the harness integrated in the conventional child safety seat may also be subjected to internal friction that could result in improper tightening of the harness.

Therefore, there is a need for a child safety seat that can provide improved restraining of a child, and can address at least the foregoing issues.

SUMMARY

The present application describes a child safety seat that can be easily installed and provide improved restraining of a child.

In one embodiment, the child safety seat includes a seat shell having a backrest portion and a sidewall protruding forward from the backrest portion, an adjustable headrest movable along the backrest portion, and a first belt guide fixedly connected with the sidewall at a top thereof and a second belt guide provided on the headrest, wherein the first belt guide and the second belt guide are configured to receive a shoulder belt portion of a vehicle seatbelt disposed through a gap between the sidewall and the headrest.

According to yet another embodiment, the child safety seat includes a seat shell having a backrest portion, a latch belt disposed transversally across the seat shell and having two opposite ends respectively provided with two connectors for attachment to an anchorage provided in a vehicle, and a storage compartment on a rear of the backrest portion adapted to receive the two connectors of the latch belt.

DETAILED DESCRIPTION OF THE EMBODIMENTS

Figure 1:
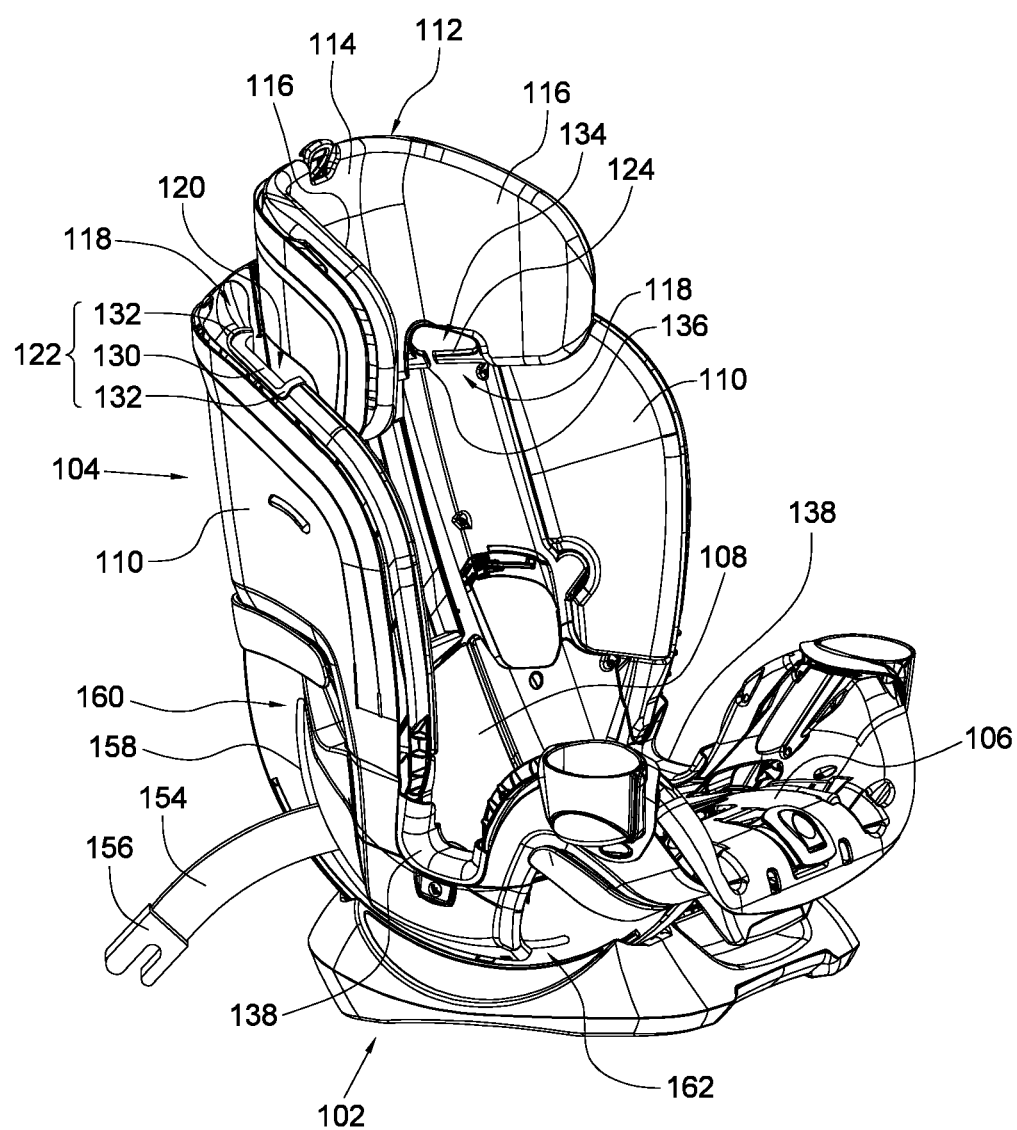
FIG. 1 is a perspective view illustrating an embodiment of a child safety seat.

FIG. 1 is a perspective view illustrating an embodiment of a child safety seat 100 suitable for seating a child in a vehicle. The child safety seat 100 can exemplary include a support base 102, and a seat shell 104 disposed on the support base 102. The support base 102 can provide stable support for the seat shell 104, and allow recline adjustment of the seat shell 104. The seat shell 104 can have a seat portion 106, a backrest portion 108 and two sidewalls 110. The seat shell 104, including the seat portion 106, the backrest portion 108 and the sidewalls 110, may be formed by plastic molding.

The two sidewalls 110 can protrude forward from the backrest portion 108 and respectively extend along a left and a right side of the backrest portion 108. The two sidewalls 110 can sideways delimit an interior of the seat shell 104 where a child can be received, and can provide lateral protection for the child's body. The backrest portion 108 can be assembled with an adjustable headrest 112 disposed between the two sidewalls 110. The headrest 112 is movable along the backrest portion 108 between the two sidewalls 110 for adjustment in accordance with the height of a child received in the seat shell 104. According to an embodiment, the headrest 112 can include a central support portion 114, and two side support portions 116 protruding forward at a left and a right side of the central support portion 114. The two side support portions 116 can provide lateral protection for a child's head.

Figure 2:
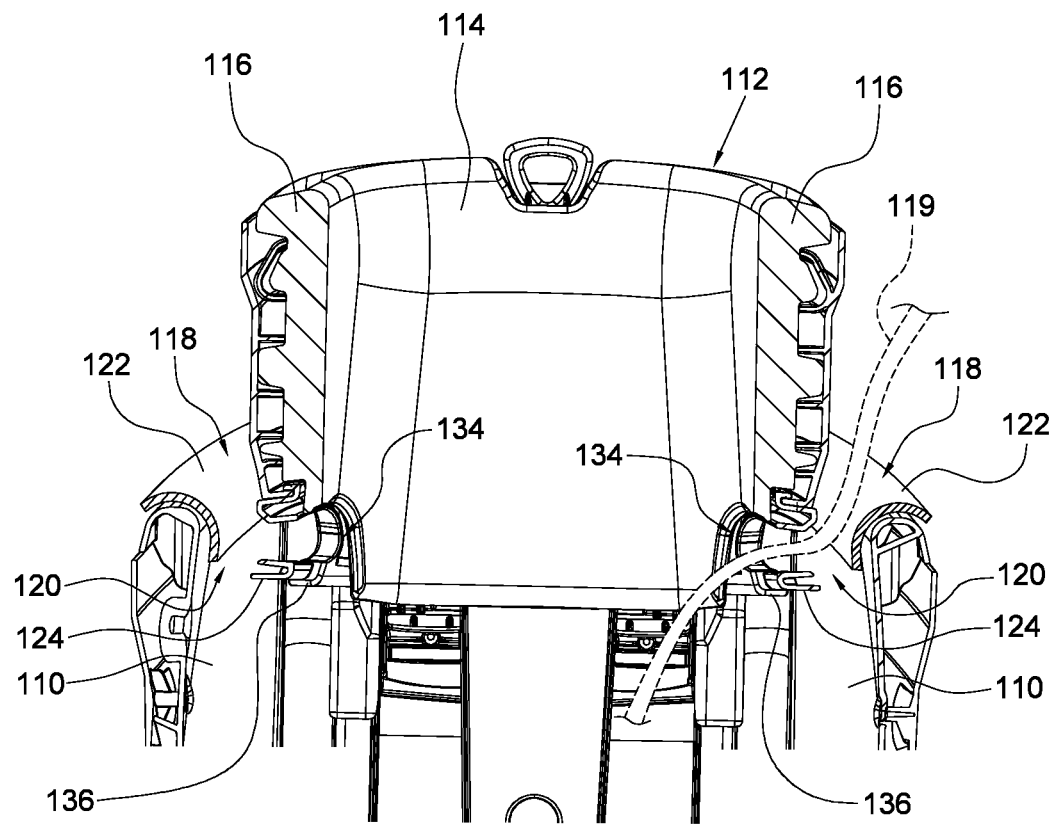
FIG. 2 is a cross-sectional view illustrating further construction details of the child safety seat.

In conjunction with FIG. 1, FIG. 2 is a cross-sectional view illustrating further construction details of the child safety seat 100. Referring to FIGS. 1 and 2, each of the left and right sides of the child safety seat 100 can further include a belt path 118 adapted to receive a shoulder belt portion 119 (shown with phantom lines in FIG. 2) of a vehicle seatbelt. More specifically, the belt path 118 at each of the left and right sides can include a gap 120 defined between the sidewall 110 of the seat shell 104 and the side support portion 116 of the headrest 112 adjacent thereto, and two belt guides 122 and 124 that can receive the shoulder belt portion 119 disposed through the gap 120. The belt guide 122 is fixedly connected with the sidewall 110 of the seat shell 104, and the belt guide 124 is provided on the side support portion 116 of the headrest 112. The gap 120 may be delimited by the backrest portion 108 at the rear and opened at the front. The gap 120 is configured to receive the shoulder belt portion 119 of the vehicle seatbelt, and to allow smooth sliding of the shoulder belt portion 119 through the gap 120. According to an example of construction, the gap 120 is larger than the thickness of the shoulder belt portion 119 so as to allow its smooth sliding, e.g., a width of the gap 120 taken between the sidewall 110 of the seat shell 104 and the side support portion 116 of the headrest 112 may be substantially greater than 2 times the thickness of the shoulder belt portion 119. A length of the belt path 118, which can be defined as a length of the gap 120 between the two belt guides 122 and 124, can increase when the headrest 112 moves downward relative to the backrest portion 108 and decrease when the headrest 112 moves upward relative to the backrest portion 108.

Referring to FIGS. 1 and 2, at each of the left and right sides of the seat shell 104, the belt guide 122 can be fixedly connected with the sidewall 110 at a top thereof. According to an embodiment, the belt guide 122 may be disposed adjacent to a junction between the sidewall 110 and the backrest portion 108. Moreover, the belt guide 122 can extend into the gap 120 between the sidewall 110 of the seat shell 104 and the side support portion 116 of the headrest 112. According to an example of construction, the belt guide 122 may have a base portion 130, and two ridges 132 protruding from the base portion 130. According to an example of construction, the belt guide 122 including the base portion 130 and the two ridges 132 may be formed integrally as a single body. The belt guide 122 can receive the shoulder belt portion 119 of the vehicle seatbelt between the two ridges 132, which can help to restrictedly position the shoulder belt portion 119.

Referring to FIGS. 1 and 2, at each of the left and right sides of the headrest 112, the belt guide 124 can be disposed adjacent to a lower edge of the side support portion 116. More specifically, the belt guide 124 can be placed adjacent to a junction between the side support portion 116 and the central support portion 114 of the headrest 112. According to an example of construction, the belt guide 124 can include a belt hole 134 configured to receive the shoulder belt portion 119, and a slit 136 provided on a lower edge of the belt guide 124 for insertion of the shoulder belt portion 119 through the slit 136 into the belt hole 134. The slit 136 is narrower than the belt hole 134 so that the belt guide 124 can restrict the shoulder belt portion 119 received in the belt hole 134. Like the belt guide 122, the belt guide 124 may be made of a plastic material having a relatively low coefficient of friction with respect to the shoulder belt portion 119 of the vehicle seatbelt for facilitating sliding of the shoulder belt portion 119 in contact with the belt guide 124. The belt guide 124 may be made of the same material as the belt guide 122, or may be made of a different material.

Referring to FIG. 1, the seat shell 104 can further include two belt guides 138 respectively provided at the left and right sides below the two sidewalls 110. The two belt guides 138 can be used for positioning a lap belt portion of a vehicle seatbelt.

With the aforementioned construction, the child safety seat 100 can be used to seat a relatively taller child in a vehicle by using the vehicle seatbelt for restraining the child. Once the child safety seat 100 is placed on the vehicle seat, the vehicle seatbelt can be attached with the lap belt portion thereof disposed transversally across the child safety seat 100 through the two belt guides 138, and the shoulder belt portion of the vehicle seatbelt can be guided through the belt guides 122 and 124 of the belt path 118 on one of the left and right sides. The belt guides 122 and 124 can reduce friction with the shoulder belt portion of the vehicle seatbelt, thereby facilitating passage of the shoulder belt portion along the belt path 118. Accordingly, the vehicle seatbelt can be properly tightened across the child on the child safety seat 100 for better protection.

According to an example of construction, the belt guides 122 and/or 124 can be made of a material that facilitates sliding of the shoulder belt portion 119 in contact with the belt guides 122 and/or 124. For example, the belt guides 122 and/or 124 may be made of a plastic material having a relatively low coefficient of friction with respect to the shoulder belt portion 119 of the vehicle seatbelt. Examples of plastic materials for the belt guides 122 and/or 124 can include, without limitation, nylon or polyoxymethylene (POM). Because the shoulder belt portion 119 can slide with reduced friction with respect to the belt guides 122 and/or 124, the ability of the shoulder belt portion 119 to retract will not be impeded, and the vehicle seatbelt can be properly tensioned across the child to provide effective protection.

Figure 3:
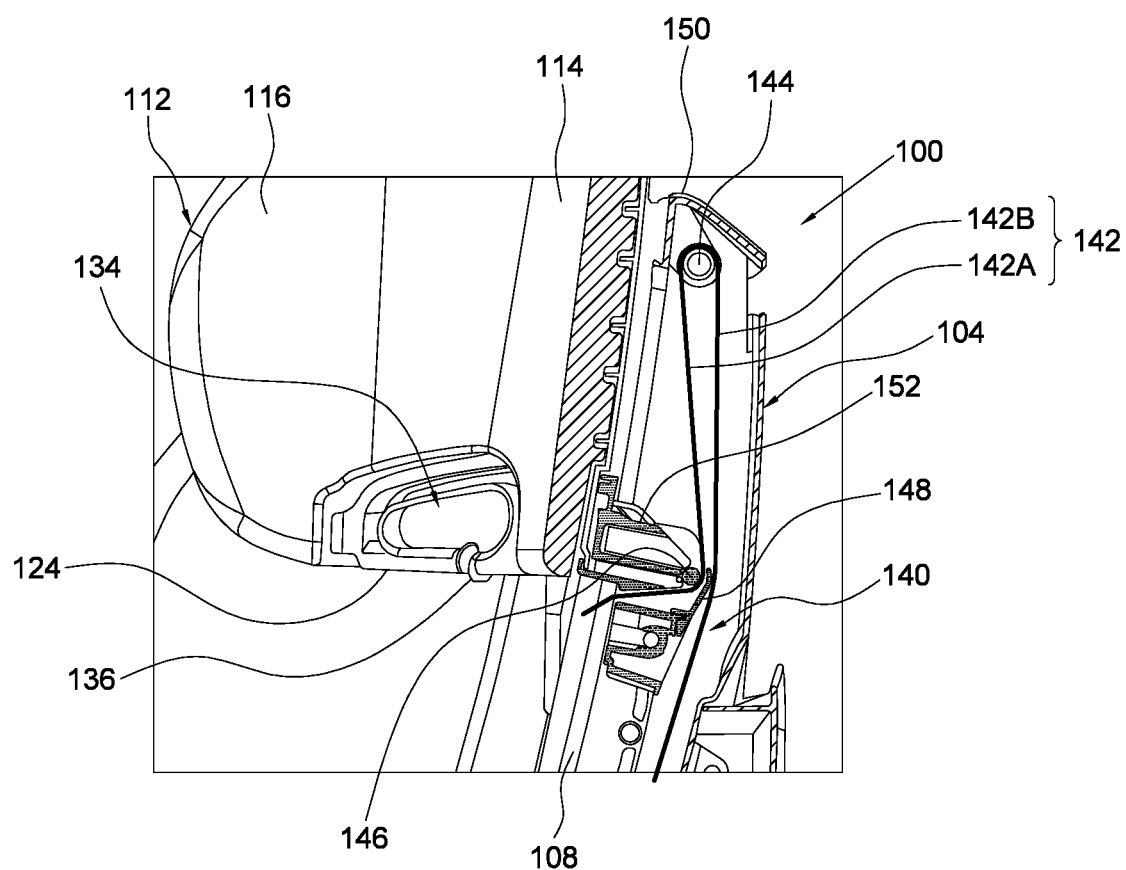
FIG. 3 is a cross-sectional view illustrating an embodiment of a child restraining harness that may be provided in the child safety seat.

FIG. 3 is a cross-sectional view illustrating an embodiment of a child restraining harness 140 that may be coupled to the child safety seat 100. Referring to FIG. 3, the child safety seat 100 may further include a child restraining harness 140 coupled to the seat shell 104 for restraining a child in the seat shell 104. The child restraining harness 140 can include a harness strap 142, which can be exemplary a shoulder strap portion. The harness strap 142 is routed through an interior of the seat shell 104, and is coupled to the headrest 112. The harness strap 142 is thereby adjustable along with the headrest 112 to adapt to the size of a child received in the seat shell 104.

For guiding the harness strap 142, the seat shell 104 can include a rod 144, and the headrest 112 can be fixedly connected with a rod 146 and a spacer 148. The first rod 144 is disposed inside the seat shell 104. More specifically, the first rod 144 can be fixedly connected with the seat shell 104 adjacent to a top 150 of the backrest portion 108, and can extend transversally relative to the backrest portion 108. The second rod 146 and the spacer 148 can be fixedly connected with the headrest 112 adjacent to each other. For example, a coupling mount 152 can be fixedly connected with the headrest 112 and protrude at a rear thereof, and the second rod 146 and the spacer 148 can be fixedly attached to the coupling mount 152. The headrest 112 is vertically adjustable relative to the backrest portion 108 with the second rod 146 and the spacer 148 remaining below the first rod 144.

The harness strap 142 can wrap around the first rod 144 and form two folded strap portions 142A and 142B that extend downward from the first rod 144. The folded strap portion 142A can wrap around the second rod 146 and extend outward at a front of the backrest portion 108, and the folded strap portion 142B can extend downward past the second rod 146. The spacer 148 can be disposed between the two folded strap portions 142A and 142B for preventing a contact between the two folded strap portions 142A and 142B. In the illustrated embodiment, the two folded strap portions 142A and 142B are closest to each other in a region adjacent to the second rod 146, and the spacer 148 can be placed in this region to effectively prevent contact between the two folded strap portions 142A and 142B. Accordingly, undesirable friction between the two folded strap portions 142A and 142B can be avoided, which can facilitate adjustment and/or tightening of the child restraining harness 140.

It will be appreciated that the features and advantages described herein in relation to the child restraining harness 140 may be provided for various embodiments of the child safety seat 100. For example, the features described herein in relation to the child restraining harness 140 may be implemented separately or in combination with the belt path 118 according to the design requirements for the child safety seat 100.

Figure 4:
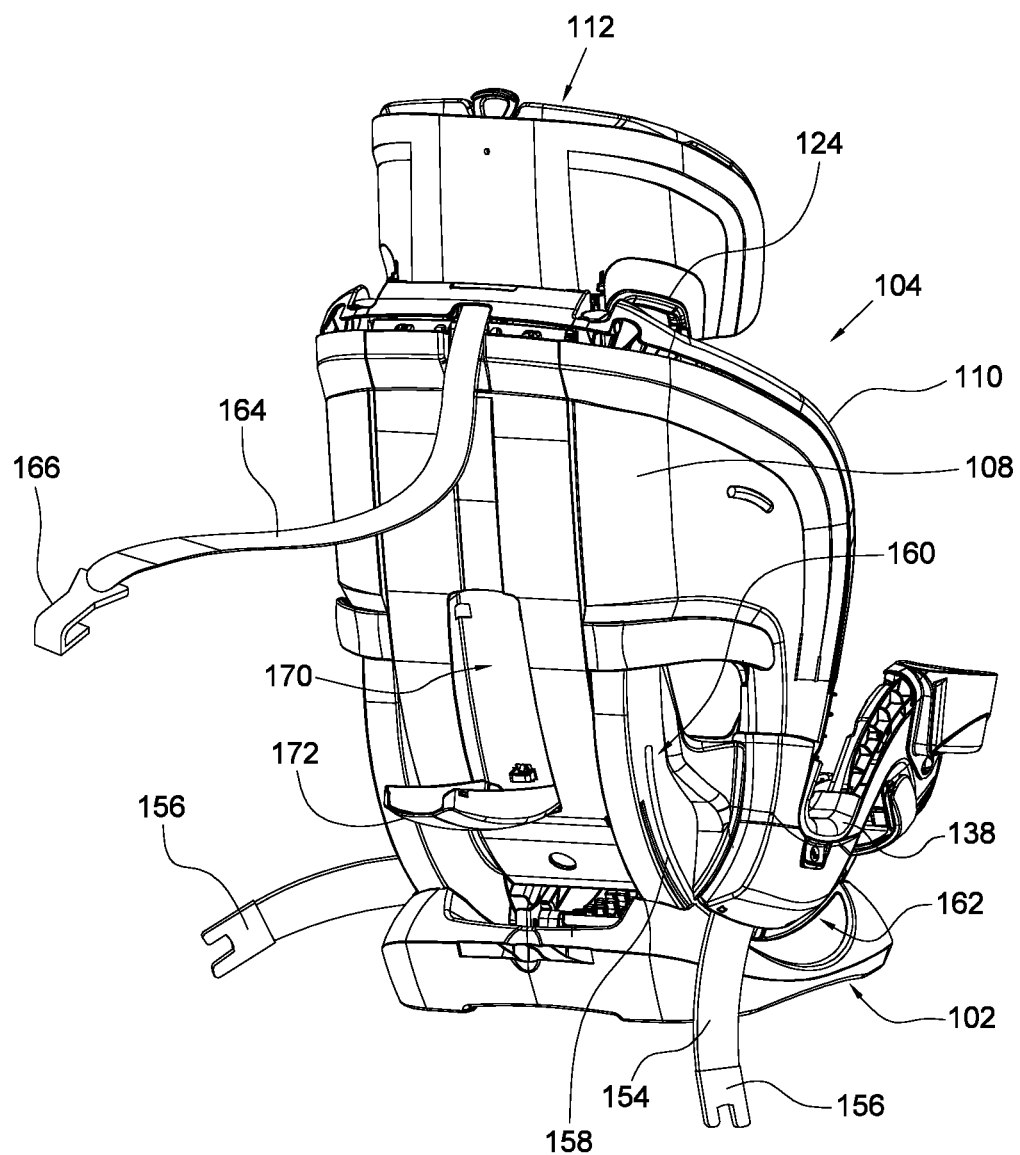
FIGS. 4 and 5 are perspective views illustrating an embodiment of the child safety seat including attachment features for securely fastening the child safety seat on a vehicle seat and a storage compartment for storing the attachment features.
Figure 5:
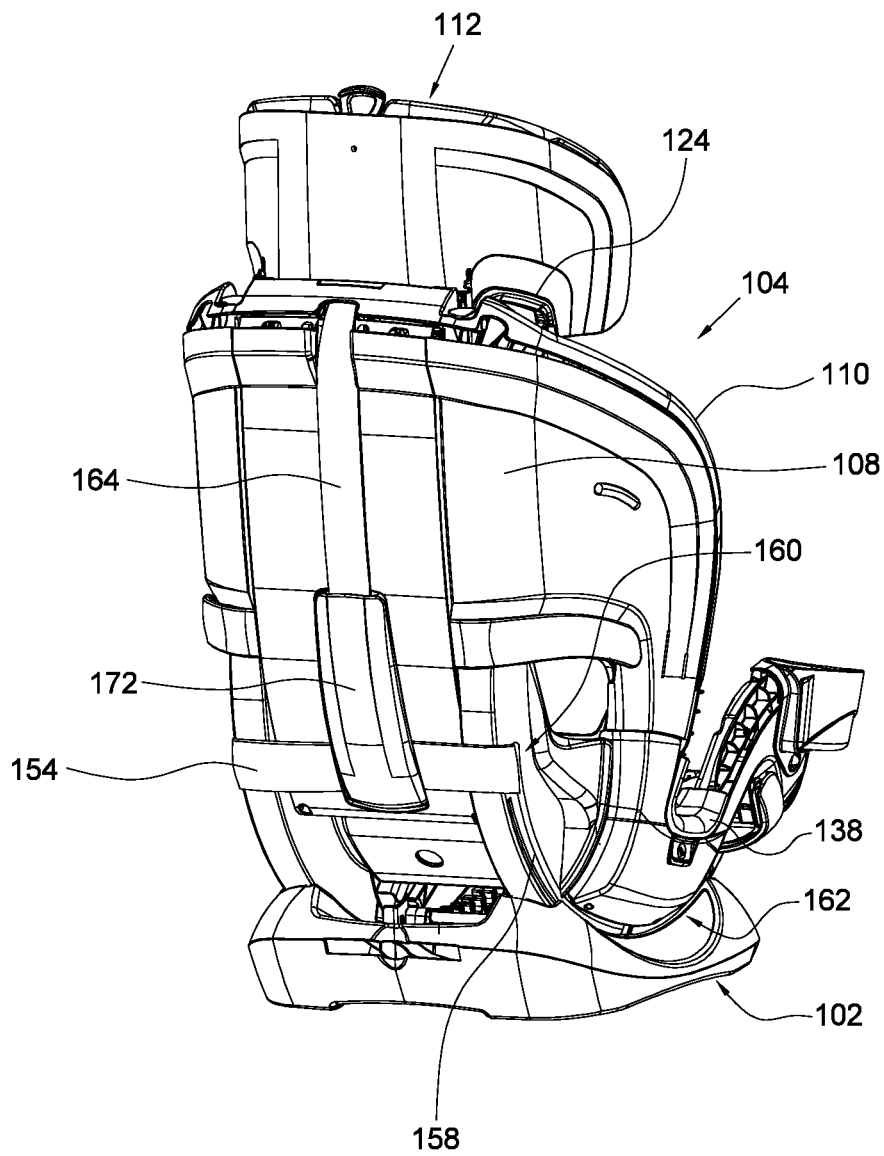

In conjunction with FIG. 1, FIGS. 4 and 5 are perspective views illustrating an embodiment of the child safety seat 100 that may include further attachment features for securely fastening the child safety seat 100 on a vehicle seat. Referring to FIGS. 1, 4 and 5, in addition to or alternatively to the use of a vehicle seatbelt, the child safety seat 100 can include a latch belt 154 for fastening the child safety seat 100 on a vehicle seat. The latch belt 154 is disposed transversally across an interior of the seat shell 104, and has two opposite ends that extend outside the seat shell 104 and are respectively provided with two connectors 156 for attachment to an anchorage of a vehicle. The connectors 156 are operable to engage with the anchorage of the vehicle for fastening the child safety seat 100 on the vehicle seat. According to an embodiment, the latch belt 154 can extend outward through a guide slot 158 provided in the seat shell 104 at a bottom thereof that extends from a rear region 160 in the backrest portion 108 to a front region 162 close to the front of the seat shell 104. The latch belt 154 can slide along the guide slot 158 for adjustment between two positions: a first position where the latch belt 154 is placed in the rear region 160 for fastening the child safety seat 100 in a forward facing configuration on a vehicle seat, and a second position where the latch belt 154 is placed in the front region 162 for fastening the child safety seat 100 in a rearward facing configuration on the vehicle seat. Accordingly, the child safety seat 100 can be conveniently fastened with the latch belt 154 in the forward facing configuration and the rearward facing configuration.

Referring to FIGS. 4 and 5, the child safety seat 100 may further include a top tether 164 attachable to an upper region of the backrest portion 108. A free end of the top tether 164 can have a top tether connector 166. The top tether connector 166 may be a hook, or any other suitable structure. When the child safety seat 100 is installed in a forward facing configuration on a vehicle seat, the top tether connector 166 can attach to a tether anchor provided in the vehicle on the back of the vehicle seat. During accidental collision, the top tether 164 can prevent the child safety seat 100 from pivoting forward, so that the child is less likely to impact the back of a front vehicle seat or a center console.

Referring to FIGS. 4 and 5, the seat shell 104 may further include a storage compartment 170 on a rear of the backrest portion 108. According to an example of construction, the storage compartment 170 may be placed at a middle position on the rear of the backrest portion 108. The storage compartment 170 is adapted to receive at least the two connectors 156 of the latch belt 154 and the top tether connector 166, and can include a door 172 operable to open and close the storage compartment 170. For example, the door 172 may be pivotally connected with the seat shell 104 adjacent to a lower region of the storage compartment 170 and about a pivot axis extending transversally from a left to a right side of the seat shell 104. When the latch belt 154 is unused, the latch belt 154 can be positioned in the rear region 160 and routed into the storage compartment 170 so that the two connectors 156 are placed in the storage compartment 170. When the top tether 164 is unused, the top tether connector 166 can also be placed in the storage compartment 170. The door 172 can close the storage compartment 170 for concealing the connectors 156 of the latch belt 154 and the top tether connector 166 received therein, which is schematically shown in FIG. 5.

Advantages of the child safety seat described herein include the ability to provide improved restraining of a child for better protection when accidental collision occurs. Moreover, the child safety seat can incorporate a latch belt and a top tether for secure attachment of the child safety seat in rear and front facing configurations. When the latch belt and the top tether are unused, the connectors of the latch belt and the top tether connector can be conveniently placed and concealed in a storage compartment on a rear of the child safety seat.

Realization of the child safety seat has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child safety seat comprising:
   a seat shell having a backrest portion, and a sidewall protruding forward from the backrest portion;
   an adjustable headrest movable along the backrest portion, the headrest including a side support portion protruding forward; and
   a first belt guide fixedly connected with the sidewall at a top thereof; and
   a second belt guide provided on the headrest, the second belt guide being movable with the headrest to a position beneath the first belt guide, wherein when the sidewall and the side support portion are in an overlapping configuration, a gap suitable to receive a shoulder belt portion of a vehicle seatbelt is provided between the sidewall of the seat shell and the side support portion of the headrest and is delimited by the backrest portion at a rear and opened at a front, and the first belt guide and the second belt guide are configured to receive the shoulder belt portion of the vehicle seatbelt disposed through the gap between the sidewall of the seat shell and the side support portion of the headrest;
   wherein a length of the gap between the first belt guide and the second belt guide increases as the headrest moves downward relative to the backrest portion, to where the second belt guide is positioned beneath the first belt guide.

2. The child safety seat according to claim 1, wherein the first belt guide is made of a plastic material.

3. The child safety seat according to claim 1, wherein the first belt guide is made of nylon or polyoxymethylene (POM).

4. The child safety seat according to claim 1, wherein the first belt guide has a base portion, and two ridges protruding from the base portion, the first belt guide being adapted to receive the shoulder belt portion of the vehicle seatbelt between the two ridges.

5. The child safety seat according to claim 1, wherein the first belt guide is disposed adjacent to a junction between the sidewall and the backrest portion.

6. The child safety seat according to claim 1, wherein the first belt guide extends into the gap between the sidewall of the seat shell and the side support portion of the headrest.

7. The child safety seat according to claim 1, wherein the second belt guide is disposed adjacent to a lower edge of the side support portion.

8. The child safety seat according to claim 1, further including a latch belt disposed transversally across an interior of the seat shell and extending outward through a guide slot provided in the seat shell, the latch belt having two opposite ends respectively provided with two connectors for attachment to an anchorage provided in a vehicle.

9. A child safety seat comprising:
a seat shell having a backrest portion, and a sidewall protruding forward from the backrest portion;
an adjustable headrest movable along the backrest portion, the headrest including a side support portion protruding forward; and
a first belt guide distinct from said seat shell, said first belt guide being fixedly connected with the sidewall at a top thereof, and a second belt guide provided on the headrest, wherein a gap suitable to receive a shoulder belt portion of a vehicle seatbelt is provided between the sidewall of the seat shell and the side support portion of the headrest and is delimited by the backrest portion at a rear and opened at a front, and the first belt guide and the second belt guide are configured to receive the shoulder belt portion of the vehicle seatbelt disposed through the gap between the sidewall of the seat shell and the side support portion of the headrest;
wherein a length of the gap between the first belt guide and the second belt guide decreases when the headrest moves upward relative to the backrest portion; and
wherein the first belt guide extends beyond a surface of the sidewall into the gap, and has a base portion and two ridges protruding from the base portion inside the gap, the first belt guide being adapted to receive the shoulder belt portion of the vehicle seatbelt between the two ridges, the two ridges being adapted to restrictedly position the shoulder belt portion adjacent to the base portion.

10. The child safety seat according to claim 9, wherein the first belt guide is made of a plastic material.

11. The child safety seat according to claim 9, wherein the first belt guide is made of nylon or polyoxymethylene (POM).

12. The child safety seat according to claim 9, wherein the first belt guide is disposed adjacent to a junction between the sidewall and the backrest portion.

13. The child safety seat according to claim 9, wherein the second belt guide is disposed adjacent to a lower edge of the side support portion.

14. The child safety seat according to claim 9, further including a latch belt disposed transversally across an interior of the seat shell and extending outward through a guide slot provided in the seat shell, the latch belt having two opposite ends respectively provided with two connectors for attachment to an anchorage provided in a vehicle.

15. The child safety seat according to claim 1, wherein the first belt guide wraps around a top edge of the sidewall.

* * * * *